United States Patent

Anisimov et al.

[11] 4,373,698
[45] Feb. 15, 1983

[54] SHUTOFF VALVE ACTUATOR REMOTE CONTROL SYSTEM

[76] Inventors: Veniamin M. Anisimov, ulitsa Dekabristov, 15, kv. 6, Biisk Altaiskogo kraya; Valentin V. Belov, Klenovy bulvar, 8, kv. 47; Vsevolod I. Verkevich, ulitsa Moldagulovoi, 18, korpus 2, kv. 254, both of Moscow; Jury E. Orionov, ulitsa Dekabristov, 12, kv. 13, Biisk Altaiskogo kraya, all of U.S.S.R.

[21] Appl. No.: 179,690

[22] Filed: Aug. 20, 1980

[51] Int. Cl.³ .................................................. F16K 31/12
[52] U.S. Cl. ........................................ 251/26; 60/404; 48/192; 91/33
[58] Field of Search .................. 60/404, 405, 375, 413, 60/416; 48/190, 192; 91/28, 33; 251/26

[56] References Cited

U.S. PATENT DOCUMENTS

| | | | |
|---|---|---|---|
| 2,498,483 | 2/1950 | Campbell | 91/28 |
| 2,730,994 | 1/1956 | Light | 91/33 |
| 3,348,378 | 10/1967 | Lemley | 60/404 |
| 3,604,679 | 9/1971 | Pennington | 251/26 |
| 3,827,668 | 8/1974 | DeVries et al. | 251/26 |
| 4,065,094 | 12/1977 | Adams | 251/26 |
| 4,317,557 | 3/1982 | Orr | 251/1 B |

FOREIGN PATENT DOCUMENTS 2264463 4/1976 Fed. Rep. of Germany .
875126 8/1961 United Kingdom .................. 91/33

OTHER PUBLICATIONS

Service Manual No. 649577 for a 300 mm diameter, 75 kgf/cm² ball valve, by the firm Saut du Tam, France.

*Primary Examiner*—George L. Walton
*Attorney, Agent, or Firm*—Lilling & Greenspan

[57] ABSTRACT

A shutoff valve actuator remote control system includes a main control apparatus and a duplicating control apparatus connected therewith. The duplicating control apparatus comprises a self-contained power source in the form of a gas generator with an igniter connected to an emergency remote control line, and further comprises a commutator, a safety valve, and a receiver connected with the gas generator outlet and the commutator. The commutator is also connected with the outlet from the main control apparatus and the shutoff valve actuator.

The present invention provides substantially enhanced dependability of control during breakdown conditions and features a simple design.

1 Claim, 2 Drawing Figures

SHUTOFF VALVE ACTUATOR REMOTE CONTROL SYSTEM

FIELD OF THE INVENTION

The present invention relates to pneumatic automatic control and has particular reference to a shutoff valve actuator remote control system.

The shutoff valve actuator remote control system of the present invention can be used with particular advantage for controlling pneumatic and pneumohydraulic actuators of shutoff valves in the gas industry.

The invention can also be used in the petroleum and chemical industries, heat and power engineering, and other applications where shutoff valves with actuators are employed.

DESCRIPTION OF THE PRIOR ART

Known in the art is a system for controlling shutoff valves (FRG Patent No. 2264463, class F16K 31/12, dated Apr. 26, 1972)which comprises a self-contained power source in the form of an electrically driven blower with a check valve and an additional reservoir and further comprises distributing piping and electromagnetic remote control valves.

This system suffers from the disadvantage that, owing to the sophisticated design and the need for a constant supply of substantial electric power, it does not provide sufficient control reliability during breakdown situations where failure of electric power feed may occur.

Also known in the art is a shutoff valve remote control system such as described in Service Manual No. 649577 for a 300 mm diameter, 75 kgf/cm² ball valve, by the firm Saut du Tarn, France.

This system comprises a main control apparatus which includes solenoid-operated remote control valves, a pneumatic distributor, a gas filter and dryer unit, and a reservoir containing silicone fluid, and further comprises a duplicating apparatus in the form of hand operated pumps with valves and flow restrictors, the duplicating apparatus being connected with the main control apparatus.

In this system, the natural gas being transported is used as a power source. Therefore, with the gas insufficiently filtered and dried, formation of hydrates may occur in the system at freezing ambient temperatures. Furthermore, during breakdown situations where the pressure in the gas pipeline is not enough to operate the system, the main control apparatus is inoperative and the duplicating apparatus has to be operated manually. Thus, in this system the use of the duplicating apparatus fails to provide greater reliability of remote control.

This remote control system is energized by a powerful electrical signal which has to be maintained throughout the actuation of the shutoff valve involved. Therefore, a source of electric power is required for the operation of the system and additional devices for amplification and storage of the control impulse are required for the operation of the telecontrol elements, which adversely affects the reliability of shutoff valve control, particularly in the event of a breakdown.

During breakdown circumstances, when a drop of pressure and failure of electric power supply may occur, the dependability of control is reduced sharply.

SUMMARY OF THE INVENTION

It is an object of the present invention to provide a shutoff valve actuator remote control system featuring enhanced dependability of control during breakdown circumstances.

According to the invention, there is provided a shutoff valve actuator remote control system comprising a main control apparatus and a duplicating control apparatus connected therewith. The duplicating control apparatus includes a self-contained power source in the form of a gas generator having an igniter connected to an emergency remote control line and further includes a commutator and a receiver connected with a safety valve. The receiver inlet is connected with the gas generator outlet, and the receiver outlet is connected with one inlet to the commutator. Another inlet to the commutator is connected with the outlet from the main control apparatus. The outlet from the commutator is connected with the actuator of a shutoff valve.

The present invention provides substantially enhanced dependability of control during breakdown conditions, initiates operation directly in response to a weak telecontrol pulse, and features a simple and universal design.

BRIEF DESCRIPTION OF THE DRAWINGS

The invention will now be more particularly described by way of example with reference to the accompanying drawings, wherein.

DETAILED DESCRIPTION OF THE INVENTION

Figure 1:
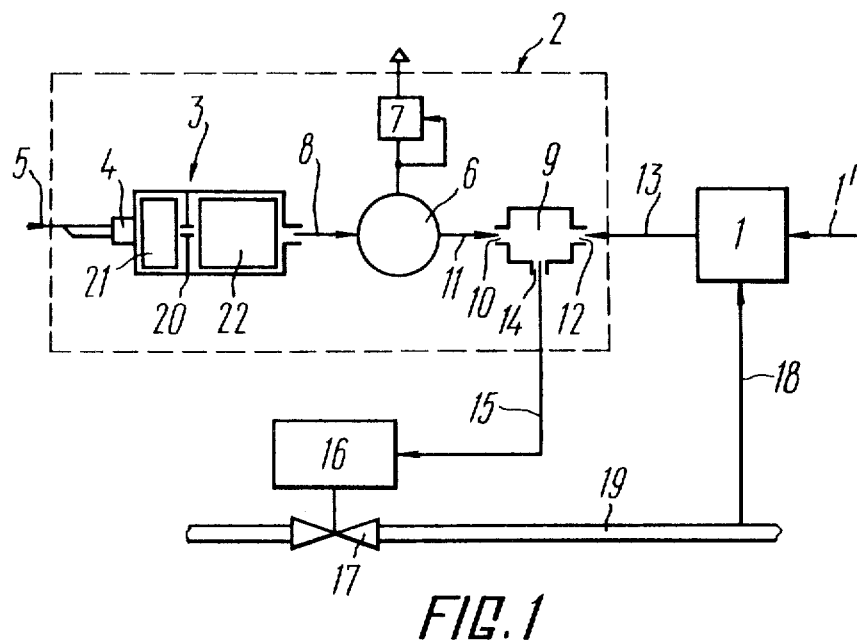
FIG 1. is a schematic view of the shutoff valve actuator remote control system according to the invention.

The shutoff valve actuator remote control system comprises a main control apparatus 1 (FIG. 1), a control line 1' thereof, and a duplicating control apparatus 2.

The main control apparatus 1 may be any apparatus or system conventionally employed for controlling a pneumatic or pneumohydraulic actuator of a shutoff valve, for example, the main control apparatus of the shutoff valve control system described in the Service Manual No. 649577 for a 300 mm diameter, 75 kgf/cm² globe valve, by Saut du Tarn, France.

The duplicating control apparatus 2 comprises a self-contained power source in the form of a gas generator 3 with an igniter 4 connected to an emergency remote control line 5 and further comprises a receiver 6 connected with a safety valve 7 and, via a communication line 8, with the outlet from the gas generator 3.

The duplicating control apparatus 2 further comprises a commutator 9. A commutator inlet 10 is connected via a line 11 with the outlet from the receiver 6. Another commutator inlet 12 is connected via a line 13 with the outlet from the main control apparatus 1. A commutator outlet 14 is connected via a line 15 with an actuator 16 of a shutoff valve 17. The main control apparatus 1 is connected via a line 18 with a gas pipeline 19.

The gas generator 3 comprises a housing 20, solid fuel 21, and chemical coolant 22.

Figure 2:
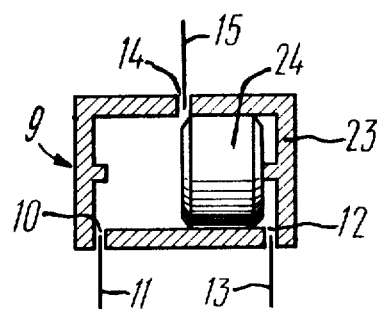
FIG. 2 is a longitudinal view, partly in section, disclosing the construction of the commutator according to the invention.

The commutator 9 has a case 23 (FIG. 2) and a slidable member 24. The inlets 10 and 12 receive the lines 11 and 13, respectively. The outlet 14 discharges into the line 15.

The shutoff valve actuator remote control system operates as follows:

In normal conditions the actuator 16 (FIG. 1) of the shutoff valve 17 is controlled through the main control apparatus 1.

An electric or pneumatic remote control signal comes through the control line 1' into the main control apparatus 1 and the main control apparatus, permits the gas coming from the pipeline 19 via the line 18 to pass through the line 13 and the inlet 12 into the commutator 9. The gas pressure shifts the slidable member 24 (FIG. 2) in the case 23 so as to open the path from the inlet 12 to the outlet 14. The gas passes through the commutator outlet 14 (FIG. 1) and the line 15 into the actuator 16, whereby the actuator 16 is caused to operate the shutoff valve 17. During breakdown conditions a control impulse is fed through the emergency remote control line 5 into the igniter 4 and the igniter 4 ignites the solid fuel 21 contained in the housing 20 of the gas generator 3. The products of solid fuel combustion, at high temperature and pressure, come into contact with the chemical coolant 22, whereby the temperature of the final combustion products is brought down and the amount of the produced gas is increased.

From the gas generator 3 the gas passes via the line 8 into the receiver 6 wherein the gas temperature is further reduced due to expansion and heat transfer. From there the gas passes through the line 11 and the inlet 10 into the commutator 9. The gas pressure shifts the slidable member 24 (FIG. 2) in the case 23 so as to open the path from the inlet 10 to the outlet 14 and close the inlet 12. The gas passes from the inlet 10 to the outlet 14 and via the line 15 (FIG. 1) into the actuator 16, causing it to operate the shutoff valve 17.

If the gas pressure in the actuator 16 exceeds the safe limit as regards the strength of the actuator parts, the safety valve 7 connected with the receiver 6 comes into action and discharges excess gas into the atmosphere.

The duplicating control apparatus 2 provides only a single operation of the shutoff valve 17. To prepare the apparatus 2 ready for further operation, the gas generator 3 is recharged with solid fuel 21 and chemical coolant 22, and the igniter unit 4 is renewed.

The use of the present invention is advantageous and favorable from an economy viewpoint on large capacity jobs where heavy gas flow is to be transported over great distances and in this connection it is very important to ensure high operational dependability of the control apparatus during breakdown circumstances, such as a pipeline burst, when the failed portion of a gas line must be shut off quickly.

Thus the invention disclosed herein provides substantially enhanced dependability of control during breakdown conditions, initiates operation directly in response to a weak telecontrol pulse, and features a simple and universal design.

We claim:

1. A shutoff valve actuator remote control system with an emergency control line and comprising:
   a main control apparatus having an outlet; and
   a transportable duplicating control apparatus connected with said main control apparatus;
   wherein said duplicating control apparatus comprises:
   a self-contained power source in the form of a gas generator with an igniter connected to said emergency control line, said gas generator having an outlet;
   a safety valve;
   a receiver connected with said safety valve and having an outlet and an inlet connected with said outlet from the gas generator; and
   a commutator having a first inlet connected with said outlet from the main control apparatus, a second inlet connected with said outlet from the receiver, and an outlet connected with said shutoff valve actuator.

* * * * *